United States Patent [19]
Pena

[11] Patent Number: 5,779,432
[45] Date of Patent: Jul. 14, 1998

[54] COMPACT PRODUCT STACKER

[75] Inventor: Daniel S. Pena, Corpus Christi, Tex.

[73] Assignee: Sam Hausman Meat Packer, Inc., Corpus Christi, Tex.

[21] Appl. No.: 878,494

[22] Filed: Jun. 18, 1997

[51] Int. Cl.⁶ .................................................. B07C 5/00
[52] U.S. Cl. .......................... 414/794.4; 198/418.6
[58] Field of Search .................... 414/788.9, 790.7, 414/790.9, 792.7, 793.4, 794.2, 794.4; 198/464.4, 431, 418.6

[56] References Cited

U.S. PATENT DOCUMENTS

| | | | |
|---|---|---|---|
| 2,254,525 | 9/1941 | Hathaway et al. | 198/418.6 |
| 3,392,853 | 7/1968 | Mitchell et al. | |
| 3,851,442 | 12/1974 | Miles | 271/35 |
| 3,866,741 | 2/1975 | Carbon et al. | |
| 3,900,919 | 8/1975 | Lekan et al. | |
| 3,915,316 | 10/1975 | Pomara, Jr. | |
| 3,920,134 | 11/1975 | Scarpa et al. | |
| 4,074,509 | 2/1978 | Miles | |
| 4,208,915 | 6/1980 | Edwards | |
| 4,236,855 | 12/1980 | Wagner et al. | |
| 4,431,104 | 2/1984 | Orlowski et al. | |
| 4,530,632 | 7/1985 | Sela | |
| 4,635,786 | 1/1987 | Renda | 198/418.6 |
| 4,827,692 | 5/1989 | Fiske et al. | |
| 5,135,352 | 8/1992 | Scata et al. | |
| 5,253,762 | 10/1993 | Duncan | 414/794.4 |
| 5,353,913 | 10/1994 | Steiger et al. | 198/418.6 |
| 5,720,593 | 2/1998 | Pleake | 414/794.4 |

*Primary Examiner*—Karen M. Young
*Assistant Examiner*—Gregory A. Morse
*Attorney, Agent, or Firm*—George S. Gray

[57] ABSTRACT

A compact product stacker is provided for simultaneously receiving, stacking and moving a three line series of flat-shaped products. The stacker utilizes product support paddle combinations which share common, pneumatically rotated, pivot rods. The product support paddle combinations are adjustable to a downward sloping orientation, allowing gravity to assist in moving the product from an upper conveyor to the top surface of the product support paddles, at low speeds. The product support paddle combinations and pivot rods are positioned to minimize the number of required parts, to allow the lines of product to be closer together, and to minimize the width and depth of the overall device. A product alignment feature is also provided which delays the downward movement of the paddles until all products have reached their proper positions on their respective product support paddle combinations.

36 Claims, 13 Drawing Sheets

5,779,432

COMPACT PRODUCT STACKER

BACKGROUND

It is often the case that manufacturers of relatively flat products will benefit from the ability to mechanically stack such products as they are received from the end of a conveyor belt. An added benefit arises when the stacks are automatically removed for further handling when a predetermined number of such products have been stacked. The benefits are multiplied when more than one line of such products can be received and simultaneously placed in an equal number of stacks. These benefits are particularly applicable to the meat processing industry, in which various meat products are of a generally flat shape, and are typically sold in stacks.

Currently available devices for performing this task in the meat processing industry are large, cumbersome, and involve elaborate configurations of relatively sophisticated machinery. As a result, such devices are ill suited for use in smaller, lower volume meat processing facilities, where space is at a premium.

For example, some devices require a high speed conveyor belt to feed the product into the device, some work only with frozen (rigid) product, some are incapable of receiving more than one line of product, and none are maximized for the most efficient use of space.

What is needed is a product stacker which can simultaneously receive more than one line of product, which is not dependent on a high speed conveyor belt, and which has been sized and configured for compactness.

SUMMARY OF THE INVENTION

My invention is a compact device which can receive and neatly stack multiple lines of relatively flat shaped products. The preferred embodiment of my device does not require that product be received at a high speed, and it operates at low air pressure.

In my device, I have arranged several combinations of opposing product support paddles in a tight configuration in which two pivot rods are shared by all combinations. Each combination receives and supports product from one of the multiple lines of product being discharged from an upper conveyor belt. The shared pivot rods are rotated after product motion on the product support paddle combination is detected by a product motion detector, causing the paddles to be lowered, and allowing product to fall from each product support paddle combination. The falling product forms registered stacks under each product support paddle combination, which are removed by a lower conveyor belt after a predetermined number has been reached. The lower conveyor has been constructed in a compact manner such that the stacks move only a short distance, but are completely clear of moving parts.

The shared pivot rods are transverse to the product line of travel, allowing pivot rod rotational actuators to be shared, and to be located to the side of the device. This reduces the overall depth of the device when compared to devices which have pivot rods aligned with the product line of travel. A perpendicular orientation allows more than one product support paddle combination to be operated by a single pivot rod rotation mechanism, which reduces the number of required parts. All movement of the product support paddles is in line with the product line of travel, with no movement from side to side. This allows multiple product support paddle combinations to be placed very close together.

My device also allows use of a 115V power source which is uncommon. In the preferred embodiment of my invention, the product support surface is tilted downward, which allows gravity to assist in moving the product from the upper conveyor to the product support paddles. With this assistance, it is no longer necessary to use a high speed conveyor belt to force the product into the appropriate position. The amount of tilt is adjustable to accommodate various conveyor speeds, product textures, product weights, etc. I have observed that this tilt also results in neater product stacks. My invention will also work with high speed upper conveyors.

Product movement onto the product support paddles can be further enhanced by the addition of nylon strips, rollers, or ribs on either or both of the first product support paddles or the second product support paddles. Such movement is also enhanced by adding a slight bend to each of the second product support paddles. This discourages the potential for snagging as the product enters the second product support paddle pair.

Since multiple lines of product are being handled simultaneously, the possibility exists that the three items of the product on the three lines may not be perfectly aligned as they leave the upper conveyor and move onto each of the product support paddle combinations. I have provided in the preferred embodiment, a delay between the moment of product motion detection and the time which the signal is sent to the pivot rod rotational actuators to lower the paddles. This allows the product from each line to move to an equivalent position against the product positioner at the end of the second product support paddle.

DESCRIPTION OF THE DRAWINGS

These and other features, aspects, and advantages of the present invention will become better understood with regard to the following description, appended claims, and accompanying drawings where:

DESCRIPTION

Figure 1A:
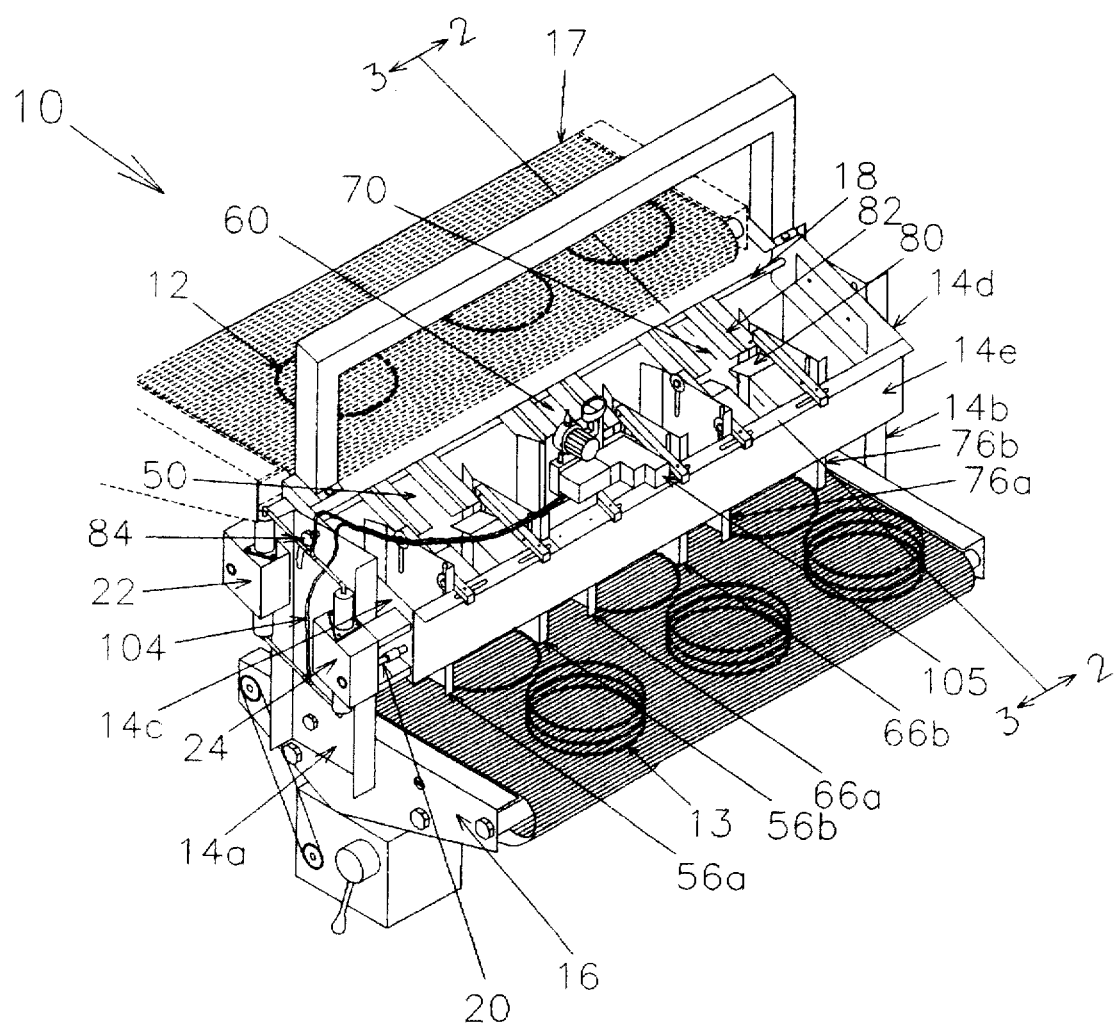
FIG. 1a shows an oblique view of the preferred embodiment of the product stacker.
Figure 1B:
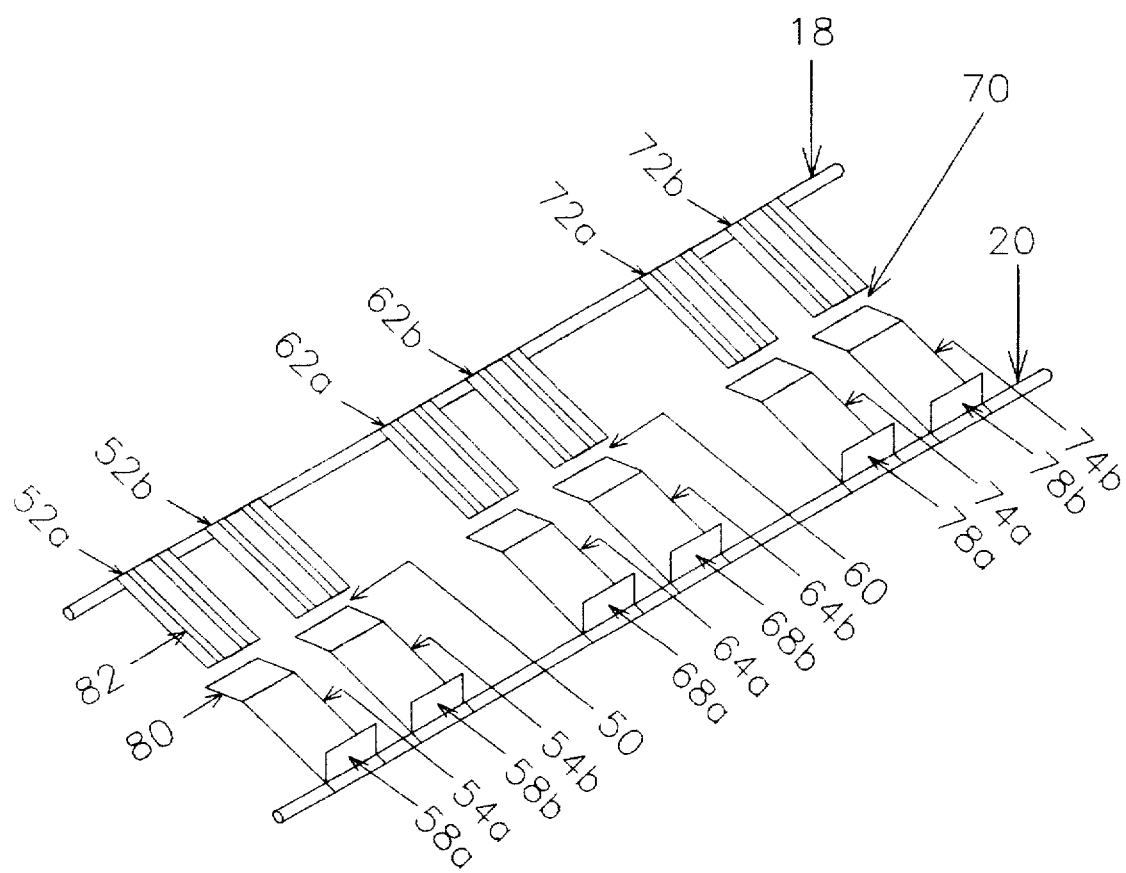
FIG. 1b is a separate oblique view of the three product support paddle combinations.

The preferred embodiment of the product stacker 10 is depicted in FIGS. 1-5, with FIGS. 2a-f illustrating the manner in which the product 12 and the product stack 13 is handled. FIG. 1a depicts stainless frame sections 14c-e, are supported by the attachment of frame sections 14a-b to each end of a specially sized lower conveyor 16. Frame sections 14c-e support the first pivot rod 18 and the second pivot rod 20. Frame section 14c supports the first pivot rod rotational actuator 22 and the second pivot rod rotational actuator 24. Three stainless steel product support paddle combinations 50, 60, 70 are attached to the first pivot rod 18 and the second pivot rod 20, as shown in FIG. 1b, the three sets of first product support paddles 52a–b, 62a–b, 72a–b are positioned on the first pivot rod 18 and the three sets of second product support paddles 54a–b, 64a–b, 74a–b are positioned on the second pivot rod 20. A shallow bend 80 is made in the receiving end of each of the second product support paddles 54a–b, 64a–b, 74a–b. FIG. 1a shows three sets of two-sided stainless steel product guides 56a–b, 66a–b, 76a–b, which are attached to frame section 14e, providing resistance to lateral product 12 movement for each of the three product 12 paths. Nylon strips 82 are attached to each of the first product support paddles 52a–b, 62a–b, 72a–b.

The first pivot rod 18 and the second pivot rod 20 can be adjusted to various positions with respect to each other, by resetting one or more of the four bolt-slot adjustment mechanisms 84. Although not entirely shown in FIG. 1a, both the front and the rear of the frame sections 14c–e can be adjusted. In this embodiment, for fresh meat patties on paper, the plane between the second pivot rod 20 and the first pivot rod 18 forms an angle of approximately 18 degrees from the horizontal, in a downward direction.

Figure 3:
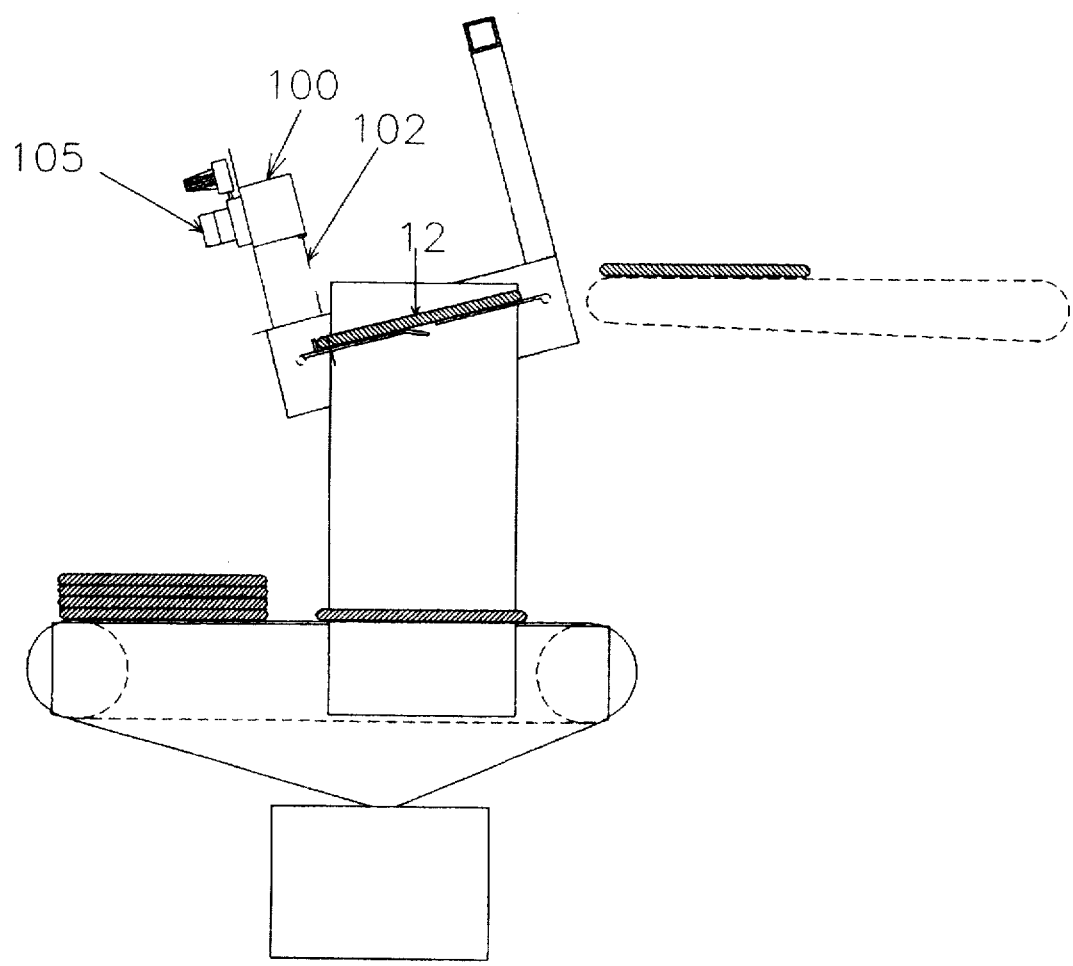
FIG. 3 is a cross-sectional view along cutting plane 3—3 as shown on FIG. 1a. This depicts the path of the electric eye beam. Not all structure is shown.

An electric eye beam assembly 100, is attached to frame section 14e, and positioned such that its beam 102 detects the movement of the product 12 along one paddle 64a of the second product support paddle pair 64a–b, as shown in FIG. 3.

Low pressure pneumatic lines 104 connect solenoid-valve assembly 105 to the first pivot rod rotational actuators 22 and the second pivot rod rotational actuators 24. The solenoid-valve assembly 105 is electrically connected to the electric eye beam assembly 100.

Figure 2A:
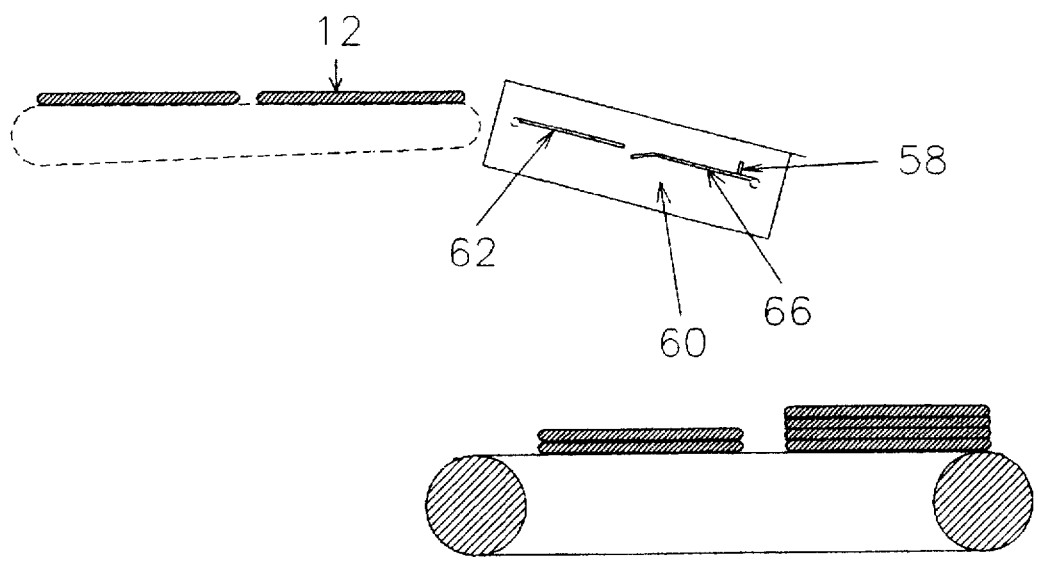
FIGS. 2a-f are cross-sectional views along cutting plane 2—2 as shown on FIG. 1. These depict the various stages of the movement of the product. Not all structure is shown.
Figure 2B:
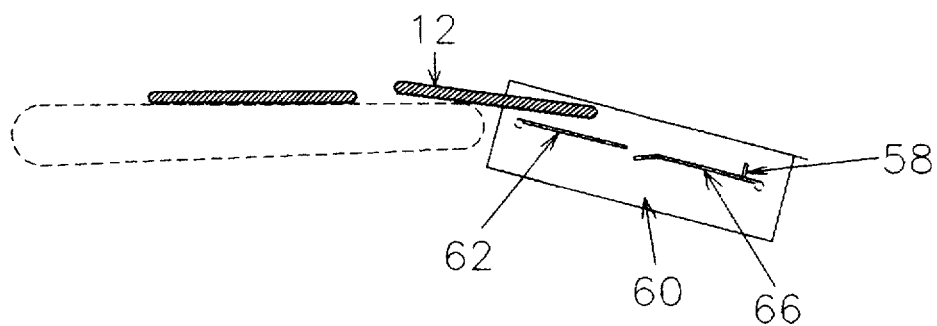
Figure 2B:
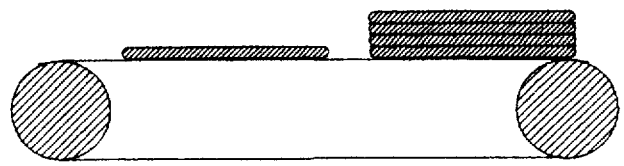
Figure 2C:
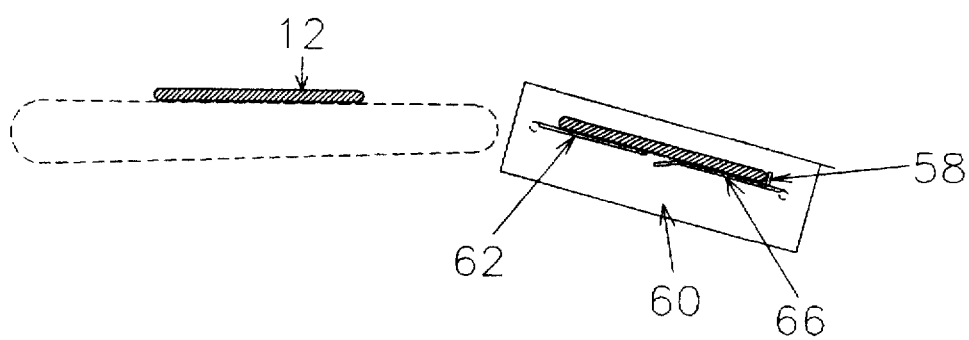
Figure 2C:
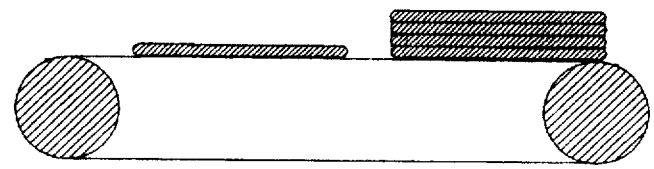
Figure 2D:
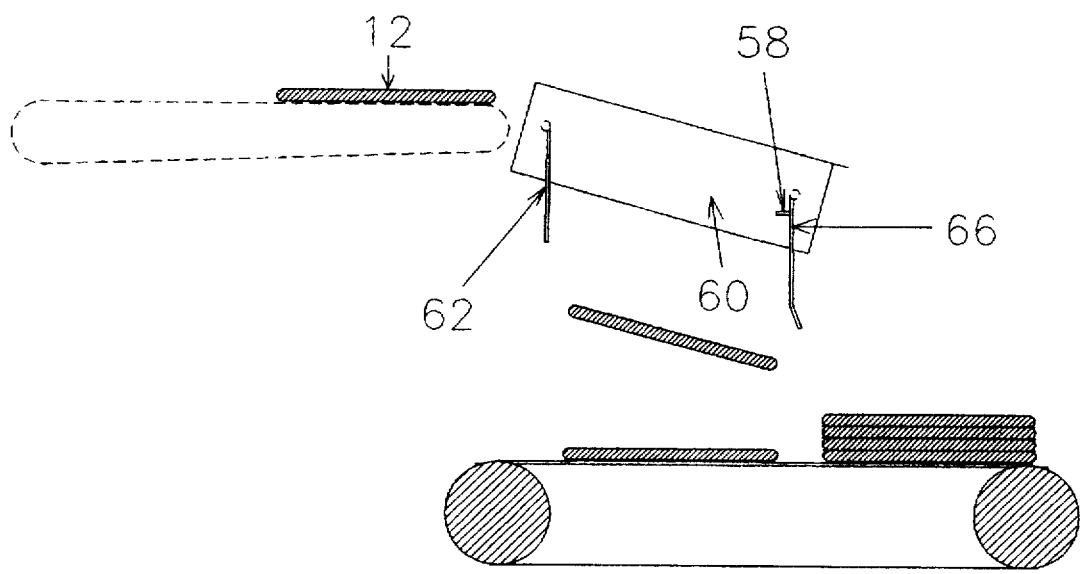

FIGS. 2a–f depict the sequence of events beginning when the product 12 approaches the first product support paddles 62a–b. In FIG. 2a, the product support paddle combination 60 is in the "paddle up" position as the product 12 (in this case a meat patty) approaches on the upper conveyor 17. In FIG. 2b, the product 12 is exiting the upper conveyor 17 and entering the product support paddle combination 60. As the product 12 moves along the first product support paddles 62a–b, its movement is enhanced by the presence of the nylon strips 82 attached to each of the first product support paddles 62a–b. In FIG. 2c, the product 12 has reached its final position on the second product support paddles 64a–b, having broken the electric eye beam 102 as it completed its travel. Because one or more products 12 on other product paths may not be perfectly aligned as the products 12 leave the upper conveyor 17, a "paddle down" delay timer is housed in the electric eye beam assembly 100, which delays the actuation of the solenoid-valve assembly 105, causing a corresponding delay in actuation of the first pivot rod rotational actuators 22 and the second pivot rod rotational actuators 24. This allows all products 12 on all product paths to reach the final position against their respective product positioners 58a–b, 68a–b, 78a–b before the product support paddle combinations 50, 60, 70 move to the "paddle down" position, as shown in FIG. 2d.

A "paddle up" delay timer, is housed in the electric eye assembly 100 which prevents the three product support paddle combinations 50, 60, 70 from returning to the "paddle up" position until the product 12 has had time to clear the product support paddle combinations 50, 60, 70.

Figure 2E:
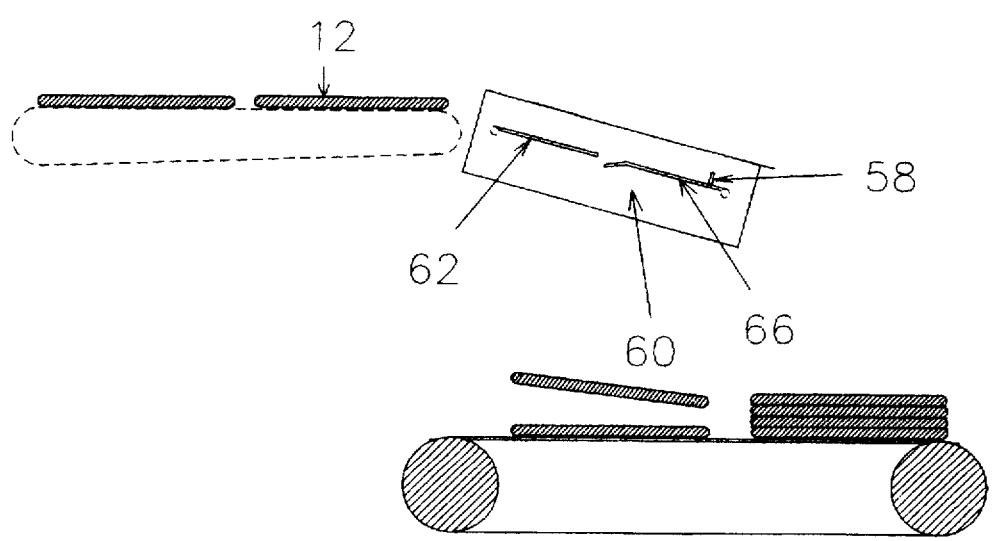
Figure 2F:
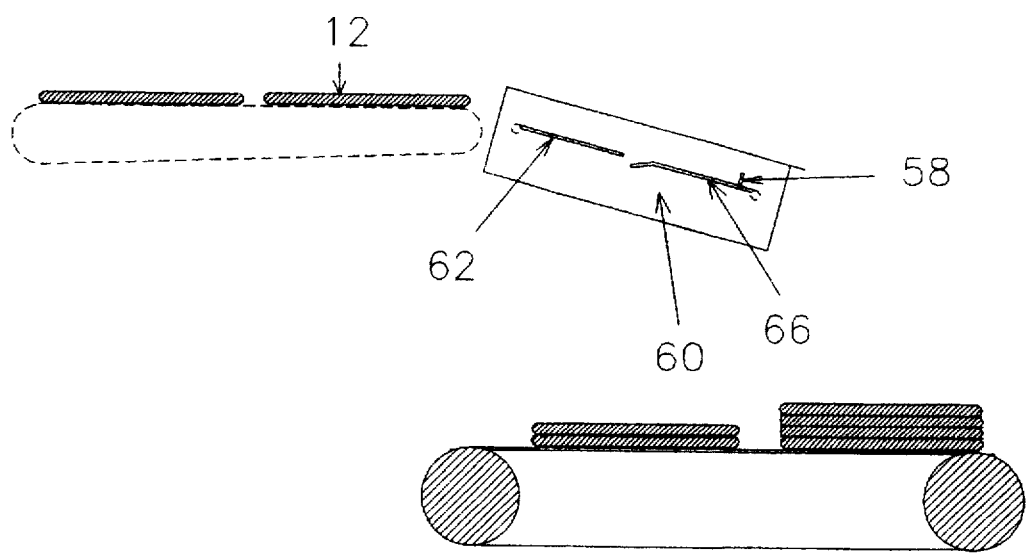

After this delay, the three first product support paddles 52a–b, 62a–b, 72a–b and the three second product support paddles 54a–b, 64a–b, 74a–b return to the "paddle up" position as shown in FIG. 2e. At the end of the sequence, the product 12 is in the stacked position between the product guides 56a–b, 66a–b, 76a–b as shown in FIG. 2f.

Figure 5:
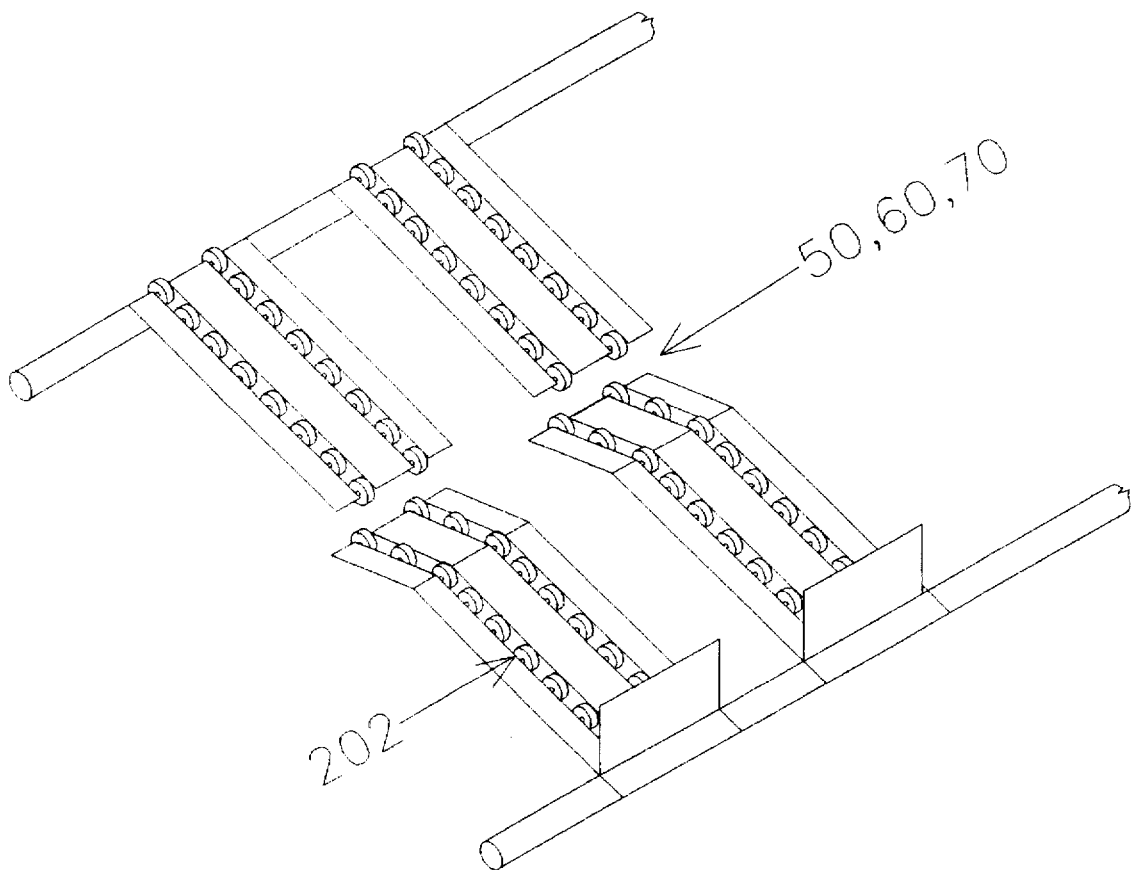
FIG. 5 is an oblique view of the product support paddle combination to which rollers have been added.
Figure 6:
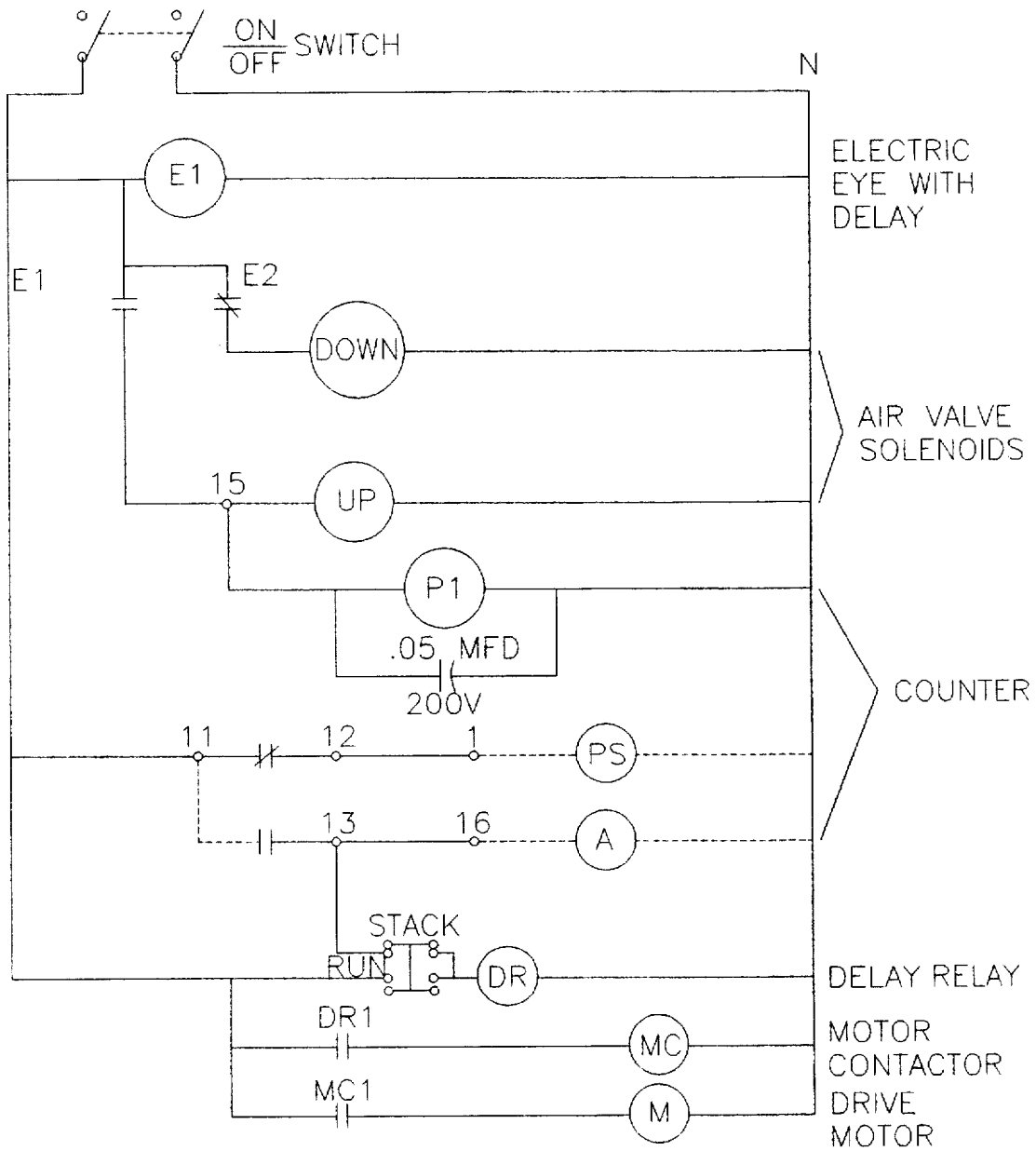
FIG. 6 is an electrical diagram showing the basic electrical configuration.
Figure 7:
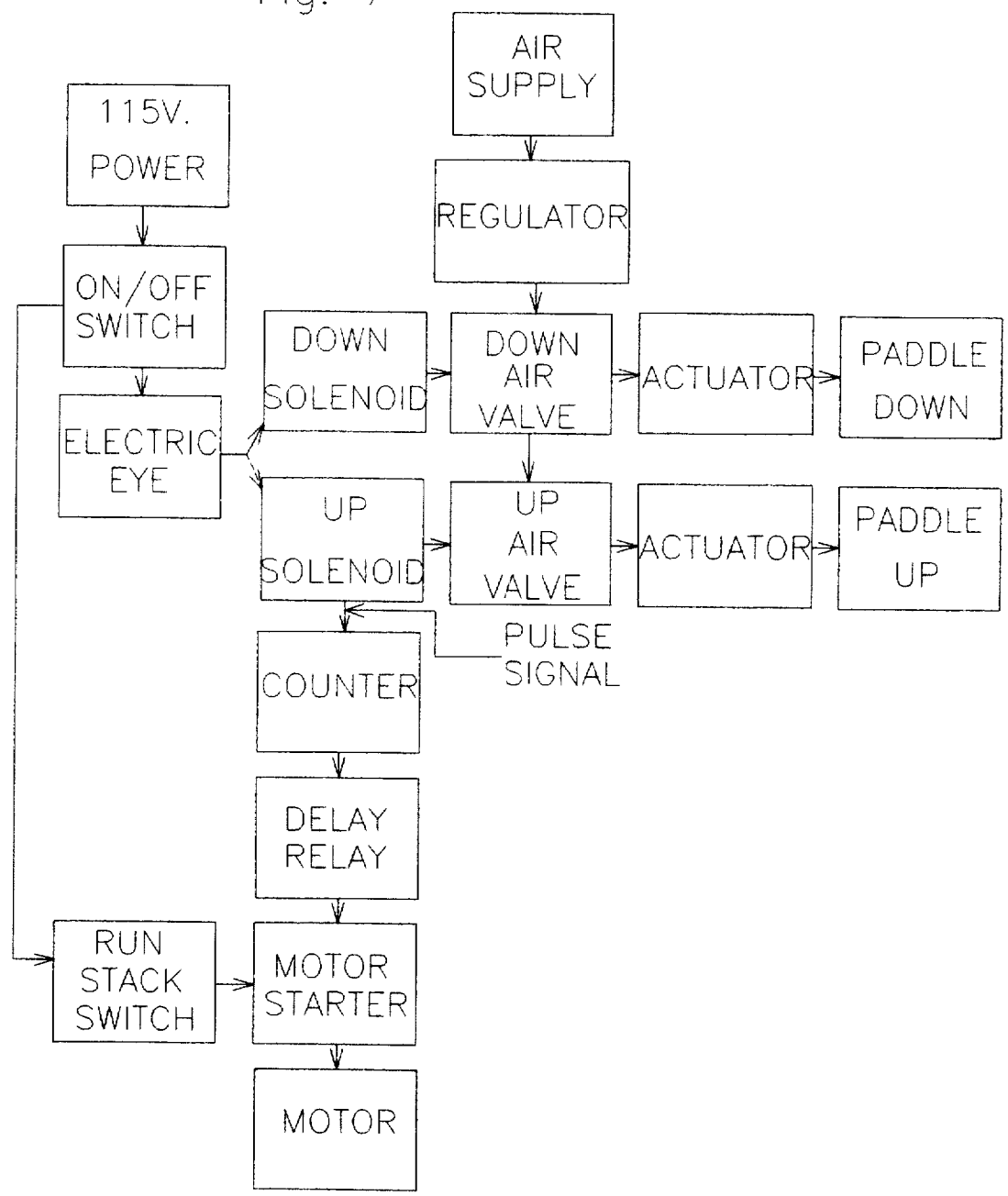
FIG. 7 is a block diagram illustrating the basic function of the machine.

As described in FIG. 5 and FIG. 6, a counter is provided which receives an impulse at the time of each upward rotational actuation of the product support paddle combinations 50, 60, 70. The lower conveyor 16 remains stationary for a predetermined number of such actuations. When the predetermined number is reached, a counter delay begins which allows time for the last product 12 to reach the stack 13, before movement of the lower conveyor 16. At the end of the counter delay, the lower conveyor 16 moves the stack 13 from beneath the product support paddle combination 50, 60, 70 and stops. The counter then resets and the entire process is repeated again. FIG. 6 symbolically depicts the basic operation of the device.

Figure 4:
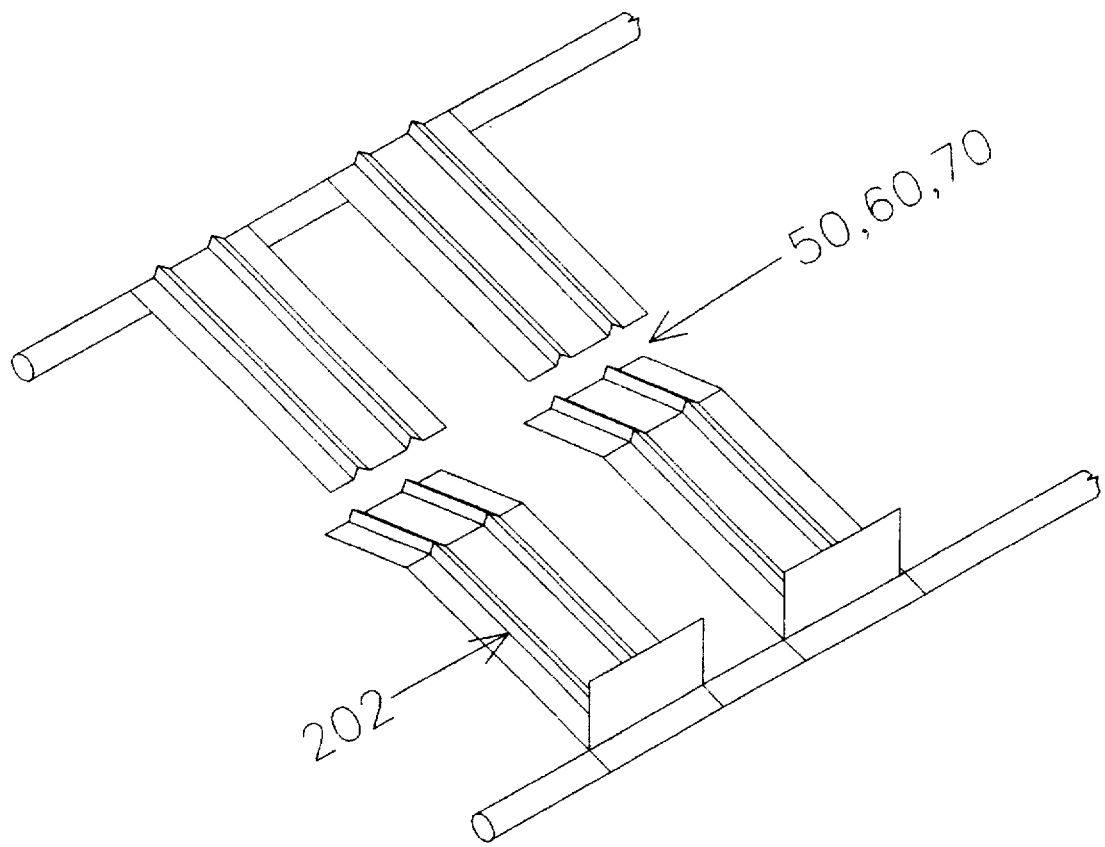
FIG. 4 is an oblique view of the product support paddle combination to which ribs have been added.

Alternative embodiments are claimed which include the addition of nylon strips 82 on the second product support paddles 54a–b, 64a–b, 74a–b, as well as, stainless steel ribs 200, and rollers 202 on both the first product support paddles 52a–b, 62a–b, 72a–b and the on the second product support paddles 54a–b, 64a–b, 74a–b, as shown in FIGS. 4–5.

In the preferred embodiment I have used a Banner Q85VR3LP-T9 electric eye beam assembly and a SMC VZ2150 solenoid valve.

I claim:

1. A product stacker for receiving a series of flat shaped product and placing such product in a stack, comprising:
   (a) a product support paddle combination having a first product support paddle and a second product support paddle, the first product support paddle having a pivot end and a top surface, and the second product support paddle having a pivot end and a top surface;
   (b) a first pivot rod to which the first product support paddle pivot end is attached;
   (c) a second pivot rod to which the second product support paddle pivot end is attached;
   (d) a frame supporting the first and second pivot rods, such that the first pivot rod transverses the path of the product, and the second pivot rod is approximately parallel to the first pivot rod, the frame further positioning the first pivot rod such that product moves onto the first product support paddle top surface and then the second product support paddle top surface as the product is discharged from the source;
   (e) product motion detection means for detecting product motion on the product support paddle combination; and
   (f) paddle movement means such that the first and second product support paddles are caused to rotate to a down position after product motion is detected on the product support paddle combination, such that the product falls from the product support paddle combination, the paddle movement means then causing the first and second product support paddles to rotate to their original position.

2. The product stacker of claim 1, further comprising product movement enhancement means, such that the product movement along the first and second product support paddle top surfaces is enhanced.

3. The product stacker of claim 2, wherein the product movement enhancement means comprises a strip of nylon positioned between the product and the first product support paddle, the strip being aligned parallel to the direction of product travel.

4. The product stacker of claim 2, wherein the product movement enhancement means comprises a plurality of ribs located on the first product support paddle top surface, the ribs being aligned parallel to the direction of product travel.

5. The product stacker of claim 2, wherein the product movement enhancement means comprises a plurality of rollers on the first product support paddle, the rollers being aligned for rotation in a direction parallel to the direction of product travel.

6. The product stacker of claim 2, wherein the product movement enhancement means comprises a strip of nylon positioned between the product and the second product support paddle, the strip being aligned parallel to the direction of product travel.

7. The product stacker of claim 2, wherein the product movement enhancement means comprises a plurality of ribs located on the second product support paddle top surface, the ribs being aligned parallel to the direction of product travel.

8. The product stacker of claim 2, wherein the product movement enhancement means comprises a plurality of rollers on the second product support paddle, the rollers being aligned for rotation in a direction parallel to the direction of product travel.

9. The product stacker of claim 2, wherein the product movement enhancement means comprises the second product support paddle, the second product support paddle having a receiving end, the receiving end having a bend.

10. The product stacker of claim 1, wherein the paddle movement means comprises:

a first pivot rod rotational actuator and a second pivot rod rotational actuator, attached to the first pivot rod and the second pivot rod, respectively, each having a paddle down air inlet and a paddle up air inlet, such that the first and second product support paddles are rotated downward and held in their down position while pressured air is being received by the paddle down air inlets, and further such that the first and second product support paddles are rotated upward and held in their original position while pressured air is being received by the paddle up air inlets; and a valve, the valve having means for receiving pressured air, and further having a paddle down air outlet in pneumatic communication with the first and second pivot rod rotational actuator paddle down air inlets, and a paddle up air outlet in pneumatic communication with the first and second pivot rod rotational actuator paddle up air inlets, the valve being in communication with the product motion detection means, such that pressured air exits the paddle down air outlet after the product motion is detected, and further such that pressured air exits the paddle up air outlet after the product has fallen.

11. The product stacker of claim 10, further comprising stack movement means for moving the product stack after a predetermined number of products have fallen.

12. The product stacker of claim 11, wherein the stack movement means comprises:

a lower conveyor, upon which the stack is formed by the falling products;

counter means for counting the number of products which have fallen;

lower conveyor activation means, such that the lower conveyor is caused to move a predetermined distance after a predetermined number of products are in the stack.

13. The product stacker of claim 12, wherein the counter means is in electrical communication with the product motion detection means and counts each time the product motion detection means detects the motion of the product on the product support paddle combination.

14. The product stacker of claim 10, wherein the paddle movement means further comprises paddle up delay means such that the upward rotation of the first and second product support paddles is delayed for a predetermined amount of time after the first and second product support paddles have reached their down position.

15. The product stacker of claim 14, wherein the paddle up delay means comprises a paddle up delay timer in electrical communication with the valve such that the pressurized air exits from the paddle down delay outlet for a predetermined amount of time.

16. The product stacker of claim 10, wherein the paddle movement means further comprises paddle down delay means such that the downward rotation of the first and second product support paddles is delayed for a predetermined amount of time after product motion is detected on the product support paddle combination.

17. The product stacker of claim 16, wherein the paddle down delay means comprises a paddle down delay timer in electrical communication with the valve such that the pressurized air exits from the paddle up delay outlet for a predetermined amount of time after product motion is detected on the product support paddle combination.

18. The product stacker of claim 10, wherein the product motion detection means comprises an electric eye beam assembly, and wherein the valve is electronically actuated and in electrical communication with the electric eye beam assembly.

19. The product stacker of claim 1, further comprising stack movement means for moving the product stack, which was formed by the falling product, after a predetermined number of products have fallen.

20. The product stacker of claim 19, wherein the stack movement means comprises:

a lower conveyor, upon which the stack is formed by the falling products;

counter means for counting the number of products which have fallen;

lower conveyor activation means, such that the lower conveyor is caused to move a predetermined distance after a predetermined number of products are in the stack.

21. The product stacker of claim 20, wherein the lower conveyor is sized and configured to move the stack only a short distance from beneath the product support paddle combination, the stack being near the end of the lower conveyor when movement ceases.

22. The product stacker of claim 1, further comprising paddle down delay means for delaying the downward rotation of the first and second product support paddles for a predetermined amount of time after product motion is detected on the product support paddle combination.

23. The product stacker of claim 22, wherein the paddle down delay means comprises a paddle down delay timer in electrical communication with the paddle movement means.

24. The product stacker of claim 1, further comprising paddle up delay means for delaying the upward rotation of the first and second product support paddles for a predetermined amount of time after the first and second product support paddles have reached their down position.

25. The product stacker of claim 24, wherein the paddle up delay means comprises a paddle up delay timer in electrical communication with the paddle movement means.

26. The product stacker of claim 1, further comprising stack alignment means.

27. The product stacker of claim 26, wherein the stack alignment means comprises a plurality of product guides, the product guides being attached to the frame and positioned about the circumference of the product as it falls.

28. The product stacker of claim 1, further comprising a plurality of product support paddle combinations, the product support paddle combinations being configured such that each combination is similarly attached to the first pivot rod and the second pivot rod.

29. The product stacker of claim 1, wherein the source is an upper conveyor.

30. The product stacker of claim 1, wherein the product support paddle combination further comprises a product positioner, the product positioner being attached to the second product support paddle, such that the product is prevented from moving beyond a predetermined point on the second product support paddle.

31. The product stacker of claim 1, wherein the first pivot rod is higher than the second pivot rod.

32. The product stacker of claim 1, further comprising product support paddle combination adjustment means, such that the positions of the first pivot rod and the second pivot rod, may be changed with respect to each other, the first pivot rod and second pivot rod remaining approximately parallel.

33. The product stacker of claim 1, wherein the product motion detection means comprises an electric eye beam assembly.

34. The product stacker of claim 1, wherein the product support paddle combination further comprises the first product support paddle, the first product support paddle having a plurality of product support paddles.

35. The product stacker of claim 1, wherein the product support paddle combination further comprises the second product support paddle, the second product support paddle having a plurality of product support paddles.

36. The product stacker of claim 1, wherein the paddle movement means comprises a first pivot rod rotational actuator and a second pivot rod rotational actuator, the first and second pivot rod rotational actuators being in communication with the product detection means and attached to the first and second pivot rods, respectively, such that the first and second product support paddles are rotated to a down position after product motion is detected on the product support paddle combination, thus allowing the product to fall from the product support paddle combination, the first and second product support paddles then being rotated to their original position.

* * * * *